Oct. 30, 1945.  M. MAIWALD  2,388,002
BRAKE PEDAL LOCK RELEASE
Filed Sept. 1, 1944
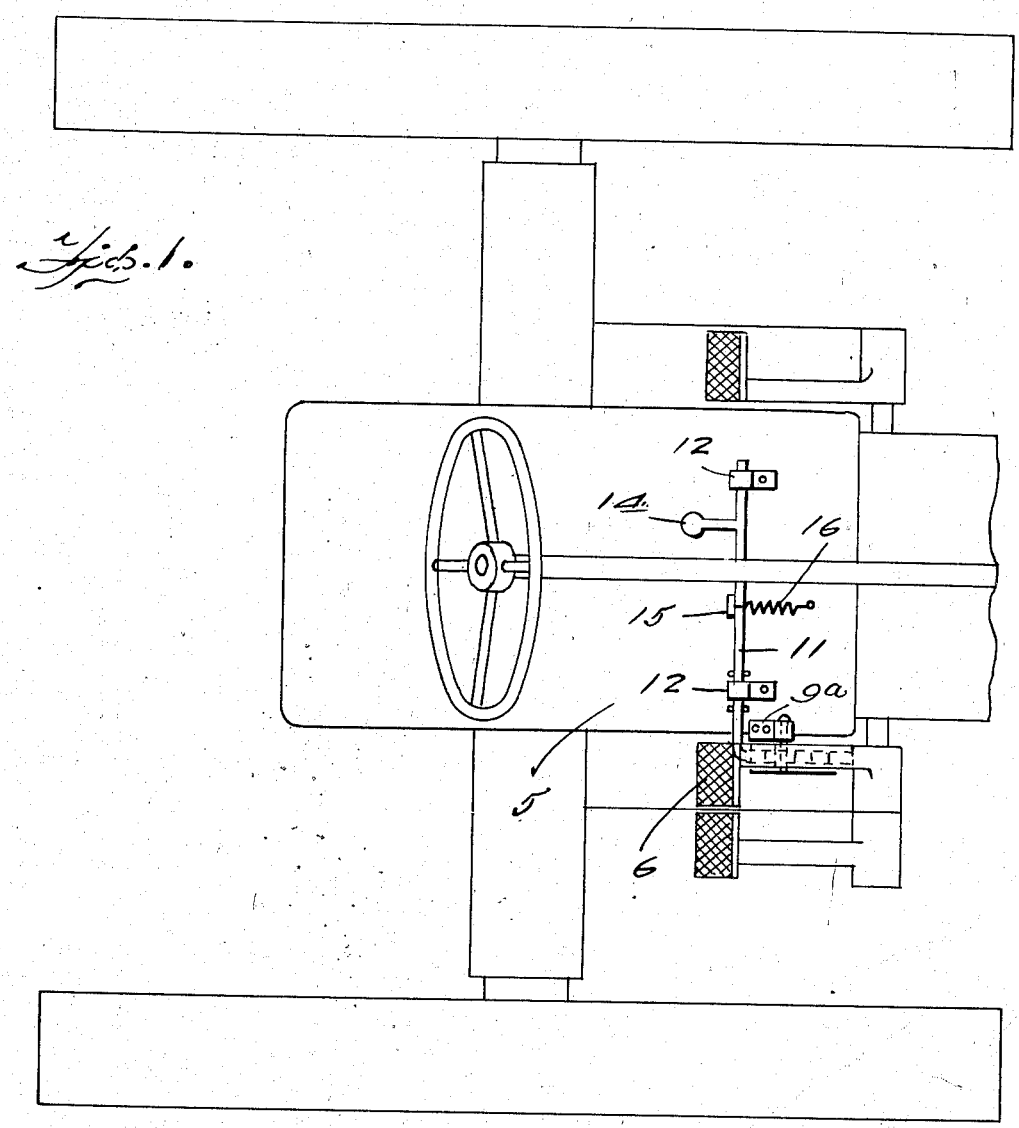
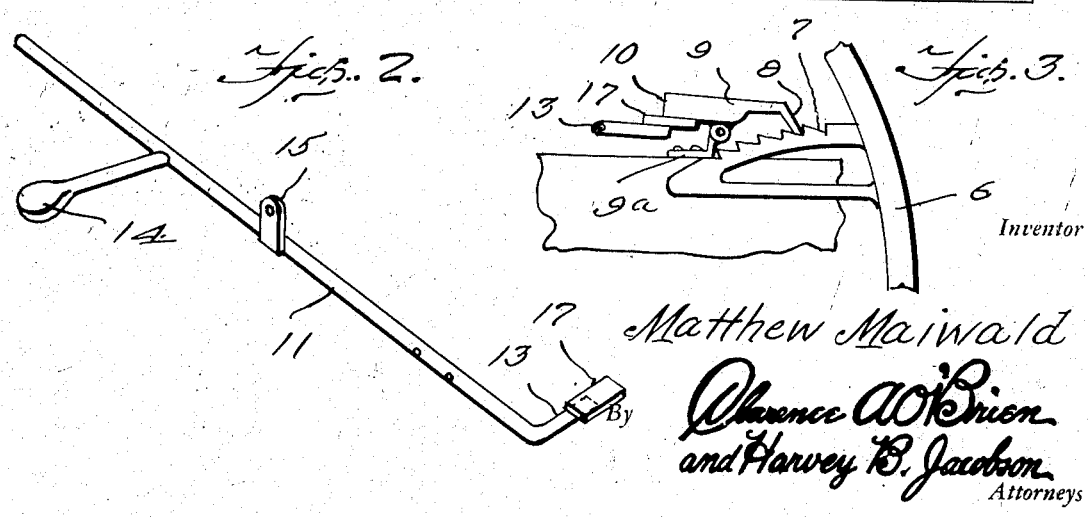
Inventor
Matthew Maiwald
By Clarence A. O'Brien
and Harvey B. Jacobson
Attorneys Patented Oct. 30, 1945

2,388,002

UNITED STATES PATENT OFFICE 2,388,002

BRAKE PEDAL LOCK RELEASE

Matthew Maiwald, Panama, Iowa

Application September 1, 1944, Serial No. 552,331

2 Claims. (Cl. 74—540)

The present invention relates to brake pedal locks of a type generally used upon tractors and the invention has for its primary object to provide a locking mechanism for the brake pedal adapted to be actuated through the provision of a foot pedal to secure the brake in its applied position, the braking mechanism gravitating into its released position when disengaged from the brake pedal.

It is the usual practice in brake pedal locks of this character to necessitate the driver reaching down and releasing the lock by hand and it is, accordingly, an object of the present invention to avoid this objectionable practice by providing foot control means for applying the lock of the brake pedal and automatically releasing the lock upon a predetermined movement of the brake pedal.

A still further object is to provide a device of this character of simple and practical construction which is efficient and reliable in performance, relatively inexpensive to manufacture and install in operative position on the tractor and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which—

Figure 1 is a top plan view.

Figure 2 is a perspective view of the brake pedal lock actuating lever, and

Figure 3 is a side elevational view of the brake pedal lock showing the same in position relative to the brake pedal.

Referring now to the drawing in detail wherein for the purpose of illustration I have disclosed a preferred embodiment of the invention, the numeral 5 designates the floor board of a tractor and the numeral 6 designates one of the brake pedals which includes a rack 7 projecting rearwardly from the pedal, the teeth of which are engageable by a downturned end 8 on one end of a dog 9 pivoted in a bracket 9a attached to the floor board to secure the brake in its applied position by tension of the usual brake releasing springs (not shown), the dog having a counter-balanced end 10 to release the dog from the teeth by gravitation.

In order to engage the dog 9, I provide a bar 11 extending transversely of the floor board 5 and rockably journaled in bearing brackets 12, one end of the bar having an arm 13 extending angularly therefrom and freely positioned under the weighted end of the dog 9.

Also projecting laterally from the bar 11 in a direction opposite from the arm 13 is a lever 14, the lever extending in a rearward direction into a position for convenient actuation by the foot of the driver.

Accordingly, a depressing action of the lever 14 will raise the arm 13 and thus raise the weighted end of the dog 9 and lower the end 8 thereof into engagement with the rack 7 whereby to hold the brake in applied position. A lug 15 rises from the rod 11 to which a coil spring 16 is attached for maintaining the lever 14 in a raised position and holding the arm 13 downwardly out of engagement with the dog 9.

To the arm 13 is also secured a plate or extension 17 of spring material which will yield to excess pressure subjected to the dog by the foot of the operator.

The end 8 of the dog will be frictionally engaged with the teeth of the rack 7 by pressure exerted on the brake pedal by the usual brake pedal releasing springs.

It is believed that the details of construction and manner of use of the device will be readily understood from the foregoing without further detailed explanation.

Having thus described the invention, what is claimed as new is:

1. A brake pedal lock comprising a rack carried by the brake pedal, a dog, and a foot actuated rockable member including a laterally extending yieldable part adapted for engaging the dog to move the latter into engagement with the rack when the member is actuated from a normal position, said dog being frictionally held in engagement with the rack and having a counter-balanced end adapted to move the dog out of engagement when released from the rack, said member being spring tensioned for return to normal position while the dog is engaged with said rack.

2. A brake pedal lock comprising a rotatably mounted shaft, a lever projecting laterally from the shaft for rotating the same in one direction, a pivoted dog, and a laterally extending yieldable member carried by the shaft and underlying the dog to move the dog into its locking position when the shaft is rotated in said direction and a spring connected to said shaft to rotate the same in the opposite direction and render said member ineffective when the dog is in locking position.

MATTHEW MAIWALD.